Nov. 7, 1967  B. D. OWEN ET AL  3,351,333
PROFILE CUTTING MACHINE
Filed Aug. 25, 1965  2 Sheets-Sheet 1
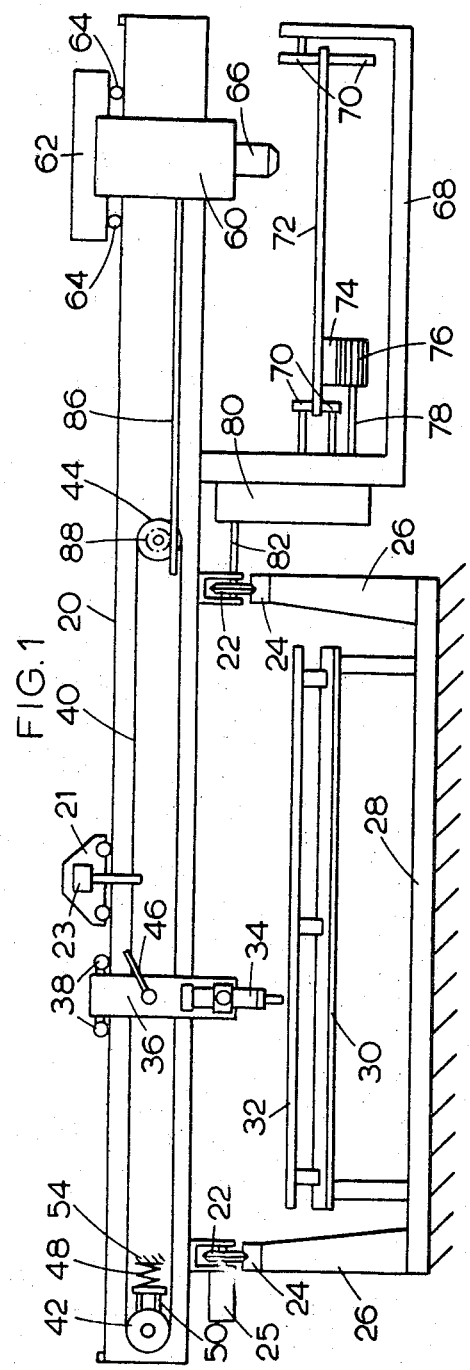
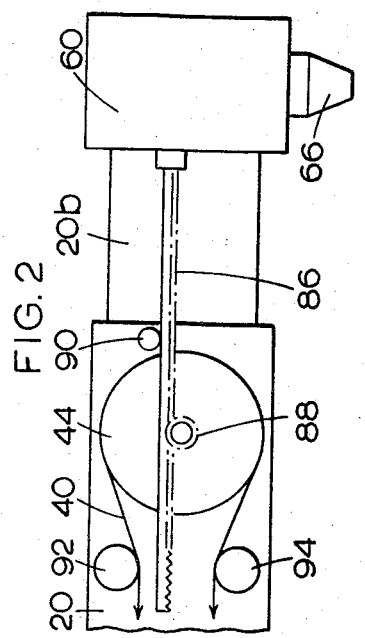
Inventors
Bernard D. Owen
Sydney W. Smith
Allan H. B. Swan
Stevens, Davis, Miller & Mosher
Attorneys

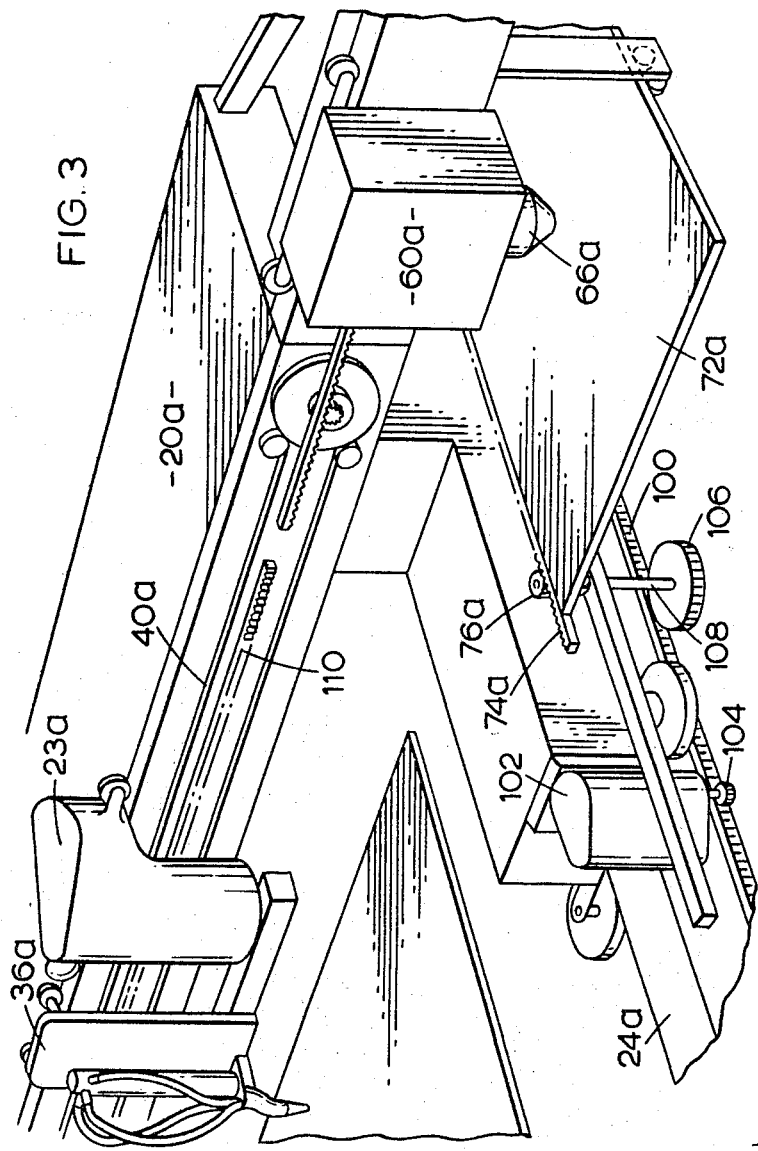

United States Patent Office 3,351,333
Patented Nov. 7, 1967

3,351,333
PROFILE CUTTING MACHINE
Bernard D. Owen, Harlow, Sydney W. Smith, Enfield, and Allan H. B. Swan, Rickmansworth, England, assignors to The British Oxygen Company Limited, London, England
Filed Aug. 25, 1965, Ser. No. 482,557
Claims priority, application Great Britain, Aug. 28, 1964, 35,342/64
29 Claims. (Cl. 266—23)

The present invention relates to profile cutting machines, for example, machines having one or more cutting heads fed with oxygen and a fuel gas and adapted to cut profiled shapes from steel plates or the like when controlled by a tracing head which follows an outline or the edge of a shaded area on a drawing or the like. It will, however, be appreciated that the invention can be applied to profile cutting machines having other forms of cutting head, for example, a plasma jet arc cutting head. In particular the present invention relates to profile cutting machines of the cross-carriage type, i.e. of the type having a cross beam adapted to span the workpiece and to be driven thereover along a rectilinear axis.

Profile cutting machines of this type are known wherein a cutting head is mounted on the cross beam so as to be movable therealong and a first mechanical connection is provided between the cutting head and the tracing head so that the tracing head moves along one axis in dependence upon the movement of the cutting head along the beam and a second mechanical connection is provided between the cross beam and a table supporting a scale reproduction of the profile to be cut so that the table moves along a second axis transverse to the first axis and in dependence upon the movement of the cross beam and the workpiece.

An object of this invention is to provide a improved drive means for driving the cutting head along the cross beam and an improved mechanical connection for linking the movement of the cutting head along the beam to the movement of the tracing head. This object is achieved by drive means for the cutting head which include a flexible substantially inextensible endless element passing around and held taut by two pulleys spaced along the cross beam, the or each cutting head being clamped by a clamping device to one or other strand of the element, and a mechanical transmission arranged to link the movement of one of the said pulleys to the movement of the tracing head.

In accordance with this invention there is provided, therefore, a profile cutting machine of the cross-carriage type comprising a cross beam adapted to span the workpiece and to be driven thereover along a rectilinear axis transverse to the beam, a cutting head mounted on the cross beam so as to be movable along the axis of the beam, two pulleys spaced apart along the axis of the cross beam, a flexible substantially inextensible endless element passing around said pulleys, a motor for driving said endless element around said pulleys and clamping means whereby the cutting head may be clamped to the endless element to be driven thereby along the beam, a table for supporting a scale reproduction of the profile to be cut, said table being movable along an axis parallel to said rectilinear axis, a tracing head for following said reproduction and being movable over said table in a direction parallel to the axis of the beam, a first mechanical connection between one of said pulleys and the tracing head effective to move the tracing head in said direction over a distance proportional to the distance moved by the cutting head along the beam, and a second mechanical connection between the cross beam and the table effective to move the table along said parallel axis over a distance proportional to the distance moved by the cross beam along said rectilinear axis. Preferably either or both mechanical connections are adapted to move the tracing head and/or table, as the case may be, a distance proportionally less, for example, a reduction ratio of 10:1, than the distance moved by the cutting head and/or cross beam respectively.

In an advantageous embodiment of the invention, the first-mentioned mechanical transmission may comprise a pinion engaging a rack secured to the tracing head for movement therewith, the pinion being rotatable with said one pulley and preferably having a pitch circle diameter smaller than the effective diameter of the pulley.

The preferred means for driving the endless element around said pulleys is a motor adapted to drive itself along the cross beam, for example by means of a pinion on the drive shaft of the motor engaging a rack extending longitudinally along the cross beam, there being provided means for clamping the motor to the endless element so that the element is driven around the pulleys as the motor runs along the beam.

In a preferred arrangement the table for supporting the reproduction is movably mounted in a frame dependent from the cross beam and is driven relative to the frame by means of a rack secured to the table engaged by a pinion which is driven in response to the movement of the cross beam.

Further features of the invention will appear from the following description of illustrative embodiments thereof, given with reference to the accompanying drawings in which:

FIG. 1 is a diagrammatic front view of a machine according to the invention;

FIG. 2 shows a detail, on an enlarged scale, of a modified arrangement for moving the tracing head in response to movement of the endless element, and FIG. 3 shows a detail, on an enlarged scale and in perspective, of a preferred arrangement for driving the cross beam and linking the movement of the cross beam to the movement of the tracing table.

The machine shown in FIG. 1 comprises a cross beam 20 having wheels 22 upon which it is mounted for movement on rails 24 extending longitudinally on either side of a workpiece 32 such as a steel plate which it is required to cut into a profiled shape with an oxygen-fuel gas cutting head 34. These rails 24 are supported by suitable columns 26 and bed frame 28 secured to the floor of the workshop. The cross beam is driven along the rails by a reversible motor 25 drivng the shaft of one of said wheels 22. A work-table 30 supports the workpiece 32.

The cutting head 34 is mounted on a cutting head carriage 36, this carriage having rollers 38 by which it is mounted on the cross beam 20 for movement along the beam. The cutting head carriage 36 is driven along the cross beam by means of a flexible substantially inextensible endless element 40 passing around and held taut by two pulleys 42 and 44 spaced apart along the cross beam. By way of example, the element 40 may be a steel band. The endless element 40 is driven by a reversible variable speed motor 23 mounted on a drive carriage 21 movable along the cross beam 20 and clamped to the endless element.

A second clamping device actuated by a handle 46 is provided to clamp the cutting head carriage 36 to the element 40. It will be immediately apparent that the direction of movement of the cutting head carriage along the beam will depend upon whether it is clamped to the lower or the upper strand of the endless element. If clamped to the upper strand the movement will be in the same direction as the motor carriage 21 and if clamped to the bottom strand it will be in the opposite direction.

Thus mirror image profiles may be cut just by altering the position of the clamp from the top to the bottom strand. To tension the element 40 the pulley 42 is urged away from pulley 44 which is fixed, by means of a tensioning device of any convenient form, for example a compression spring 48 acting on the mounting 50 of the pulley 42, the other end of the spring acting on an abutment 54 fixed to the cross beam 20.

The end of the beam 20 seen at the right-hand side of FIG. 1 is provided with a cantilever extension on which is mounted a tracing head 60 fixed to a tracing head carriage 62, the latter being provided with rollers 64 by means of which it is supported for movement along the extension. The tracing head 60 carries a tracer device 66, for example, one of the photoelectric type, the precise details of which form no part of the present invention, and which is located above a tracing table 72 adapted to receive a scale reproduction, e.g. a drawing, of the profit to be cut. The tracer device emits signals in operation for controlling the movement of the cross beam across the workpiece and the movements of the drive carriage and hence the cutting head carriage along the cross beam. These effect movement of the cutting head 34 in accordance with the drawing to be followed. The signal emitted by the tracer device are transmitted to the drive motors and actuate the motors by means which are known in the art, and the precise details of which are not necessary to an understanding of the present invention.

A framework 68 is secured to the cantilever extension of the beam 20, and this framework is provided with rollers 70 by means of which the tracing table 72 is supported for movement parallel to the rails 24, i.e. in a direction into and out of the plane of the drawing FIG. 1. A drawing which in operation is to be scanned by the tracer device 66 is placed on the tracing table 72. The underside of the table 72 is provided with a straight rack 74 parallel to rails 24 and co-operating with a pinion 76. This pinion 76 is secured to a shaft 78 which extends into a gear box 80 carried by frame 68. The input to the gear box 80 is provided by a shaft 82, secured to wheel 22, these parts 74, 76, 78, 80, 82 constituting a mechanical transmission which gives the result that in operation movement of the cross beam 20 along the rails 24 effects, after a suitable reduction within gear box 80, a proportional movement of tracing table 72. If desired, for example, by including an idler pinion within gear box 80, the direction of movement of tracing table 72 can be reversed with respect to that of beam 20. This allows mirror-image profiles to be cut.

The movement of tracing head 60 along the axis of the beam in response to movement of the cutting head carriage 36 along the beam is obtained by means about to be described. A rack 86 is secured to the tracing head 60 or to a suitable part of carriage 62, and has a toothed surface which engages with a pinion 88 fixed to a shaft of the pulley 44. These parts 86, 88 constitute a mechanical transmission driven by the pulley 44, the latter being driven via the band 40 from the drive unit constituted by drive carriage 21 and motor 23, this motor being driven in response to relative movement between the table 72 and the head 60 in a direction parallel to the axis of the beam.

The signals emitted from the tracing head 60, as it follows the drawing on the tracing table 72, are arranged to control the movement of the drive carriage 21 along the cross beam and the movement of the cross beam 20 along the rails, these together effecting movement of the cutting head 34 along the desired cutting path. Simultaneously the head 60 reproduces the movement of drive carriage 21 but moves through a distance dictated by the ratio between the pitch circle diameter of pinion 88 and the effective diameter of pulley 44. Movement of the cross beam 20 along rails 24 effects a proportionately reduced movement of tracing table 72 through gear box 80, as previously described. Movement of the tracing head around the drawing is thereby effected, the movement of the tracing head reproducing the movement of the cutting head on reduced scale.

In the preferred form of the invention, the ratio between input and output of gear box 80 is arranged to be the same as the ratio between pulley 44 and pinion 88.

Referring now to FIG. 2, this shows a slight modification of the arrangement shown in FIG. 1. Instead of being movably mounted on the cantilever extension, the tracing head 60 is fixed to the end of the cantilever extension 20b and this extension is telescopically slidable with respect to the main beam 20 thereby to permit movement of the tracing head along the axis of the beam. In this embodiment, the underside of the rack 86 is provided with teeth, which engage pinion 88 which has a pitch circle diameter of 0.75 inch. A rack tensioning device is schematically indicated at 90, and serves to eliminate or substantially reduce back lash between the rack 86 and pinion 88.

The pulley 44 is secured to a shaft (not shown) to which is also secured pinion 88, and the endless flexible element 40 is guided by guide pulleys 92, 94 so that its upper and lower strands are maintained a predetermined distance apart. In the example illustrated, the effective diameter of the pulley 44 is 7½ inches, giving a 10:1 ratio between movement of the element 40 and tracing head 60, with a consequent 10:1 ratio between the movement of cutting head 34 and the tracing head 60. The operation of the modified machine according to FIG. 2 is otherwise the same as described with reference to FIG. 1.

Referring now to FIG. 3, this shows an alternative arrangement for driving the cross beam and linking the movement thereof to movement of the table. This figure shows only those parts of the machine which are necessary for an understanding of this embodiment. Like parts are identified by the same reference numerals with the suffix *a* added.

In this latter arrangement a rack 100 is secured to rail 24a, and a reversible driver motor 102 for the cross beam 20a drives a pinion 104 engaging the rack 100. A further pinion 106 is also in engagement with the rack 100, and is mounted on a freely rotatable shaft 108 which also carries a further pinion 76a, the latter being in engagement with a rack 74a secured to the tracing table 72a. Thus movement of the main carriage 20a along the rails 24a results in a corresponding movement of tracing table 72a relative to main carriage 20a, the ratio between the distances moved by these parts being determined by the ratio between the effective diameters of pinions 76a and 106.

In this embodiment of the invention, it will be noted that gear box 80 is dispensed with, and the reduction ratio between movement of the carriage 20 in a longitudinal direction and movement of tracing table 72a in such direction is determined by the relative diameters of pinion 76a and 106. In the present instance the reduction ratio is 10:1, the same as that described above in relation to FIG. 2.

In this latter embodiment a modified drive is provided for the cutting head carriage 36a. In this case the motor 23a is adapted to drive itself along the beam by means of a pinion (not shown) engaging a rack 110 extending longitudinally of the beam. As in the FIG. 1 embodiment, the motor 23a is clamped to the endless element 40a to which is also clamped the cutting head carriage 36a. As in the previous embodiment the cutting head carriage 36a may be clamped to either the upper strand or the lower strand of the endless element 40a so that the cutting head carriage can be made to travel either in the same direction as the motor 23a or in the opposite direction.

The tracing head 60a is movable along the extension of the cross beam in a manner substantially similar to that described with reference to FIG. 1. Alternatively, the tracing head 60a could be mounted on a telescopic extension to the beam in a manner similar to that described with reference to FIG. 2.

It will be apparent that many modifications of the above described embodiments will be possible within the scope of the present invention. The flexibility of the apparatus for switching from straight profile cutting to mirror-image profile cutting and in its ease of adaptation to different scales will be particularly evident. For instance it will be appreciated that the 10:1 ratio described can easily be changed in the FIG. 1 or 2 embodiment merely by changing the pinion 76, or wheel 22, or pulley 44, or pinion 88. In like manner, other ratios can be obtained by changing pinions 76a and/or 106 in the embodiment illustrated in FIG. 3.

If desired, by a suitable choice of the relevant parts the longitudinal and transverse ratios can be made to have any desired relation to each other. This will be of use in cutting profiles from a drawing which is scaled down in one of the orthogonal directions.

It is also envisaged that the mechanical transmission between pulley 44 and tracing head 60 can take the form of an additional endless element similar in arrangement to element 40, instead of rack 86 and pinion 88 previously described. Additionally, or alternatively, the motor 23, instead of running along the beam and being clamped to the endless element, can be fixed on the beam and adapted to drive one of the pulleys 42 or 44.

Other modifications and variations will likewise be possible in the second mechanical connection between the cross beam and the table. For example, instead of driving the pinion 76 through the gear box 80 (FIG. 1), the shaft 82 from the wheel 22 could drive the pinion directly, the reduction ratio being effected by appropriate dimensions of the wheel 22 and the pinion 76.

It will be appricated also that the profile cutting machines according to the invention are not limited to machines embodying a photo-electric scanning device in the tracing head. The machines may equally well employ, for example, a tracing head having a roller or other follower adapted to follow the edge of a scale reproduction of the desired profile.

If desired a plurality of cutting heads may be mounted on the cross beam and each adapted to be driven along the beam by the endless element.

We claim:
1. A profile cutting machine of the cross-carriage type comprising:
(a) a cross beam adapted to span the workpiece to be cut;
(b) drive means for driving the cross beam along a rectilinear axis tranverse to the beam;
(c) a cutting head mounted on the beam and movable thereon along the axis of the beam;
(d) two pulleys spaced apart along the axis of the beam;
(e) a flexible substantially inextensible endless element passing around said pulleys;
(f) a motor for driving said endless element around said pulleys;
(g) a clamping means whereby the cutting head may be clamped to the endless element so as to be moved along the beam thereby;
(h) a table for supporting a scale reproduction of the profile to be cut, said table being movable along an axis parallel to said rectilinear axis;
(i) a tracing head for following said reproduction and sending signals to operate said motor and said drive means to drive the cutting head along the required cutting path;
(j) a first mechanical connection between one of said pulleys and the tracing head effective to move the tracing head in a direction parallel to the axis of the cross beam over a distance proportional to the distance moved by the cutting head along the beam; and
(k) a second mechanical connection between the cross beam and the table effective to move the table along said parallel axis over a distance proportional to the distance moved by the beam along said rectilinear axis.

2. A profile cutting machine as claimed in claim 1, wherein the motor is adapted to drive itself along the cross beam and a second clamping means is provided whereby the motor may be clamped to the endless element thereby to drive the endless element around the pulleys.

3. A profile cutting machine as claimed in claim 2, wherein there is provided a rack extending along the cross beam and a pinion engaging said rack and mounted on a drive shaft from the motor.

4. A profile cutting machine as claimed in claim 1, wherein there is provided an extension to the cross beam extending from one end thereof and on which is mounted the tracing head.

5. A profile cutting machine as claimed in claim 4, wherein the tracing head is movable along the extension.

6. A profile cutting machine as claimed in claim 4, wherein the extension is axially movable with respect to the beam thereby to effect movement of the tracing head along the axis of the beam.

7. A profile cutting machine as claimed in claim 4, wherein the said mechanical transmission includes a pinion rotatable with the pulley and a rack connected to the tracing head and engaged by said pinion.

8. A profile cutting machine as claimed in claim 7, wherein the pitch circle diameter of said pinion is less than the effective diameter of the pulley.

9. A profile cutting machine as claimed in claim 1, wherein there is provided a frame dependent from the cross beam in which frame is mounted said table, said table being movable relative to said frame along said parallel axis.

10. A profile cutting machine as claimed in claim 1, wherein the said second mechanical connection comprises a rack secured to the table and a pinion engaging said rack and driven in response to movement of the cross beam along said rectilinear axis.

11. A profile cutting machine as claimed in claim 10, wherein said cross beam is mounted on wheels and wherein said second mechanical connection comprises a gear box having an output shaft which drives said pinion and an input shaft driven by one of said wheels.

12. A profile cutting machine as claimed in claim 10, wherein said second mechanical connection comprises a shaft driving said pinion, a second pinion mounted on said shaft, a second rack engaged by said second pinion and mounted on a fixed part of the machine and wherein the first drive means comprise a motor mounted on the cross beam said motor having an output shaft and on said output shaft a pinion engaging said second rack.

13. A profile cutting machine as claimed in claim 12, wherein the pitch circle of the first pinion engaging the rack on the table is less than the pitch circle diameter of the said second pinion engaging the second rack.

14. A profile cutting machine of the cross-carriage type comprising:
(a) a cross beam adapted to span the workpiece to be cut;
(b) drive means for driving the cross beam along a rectilinear axis transverse to the beam;
(c) a cutting head mounted on the beam and movable thereon along the axis of the beam;
(d) two pulleys spaced apart along the beam;
(e) a flexible substantially inextensible endless element passing around said pulleys;
(f) a motor for driving said endless element around said pulleys;
(g) clamping means whereby the cutting head may be clamped to the endless element so as to be moved along the beam thereby;

(h) a frame dependent from the cross beam:

(i) a table mounted in said frame for supporting a scale reproduction of the profile to be cut, said table being movable relative to the frame along an axis parllel to said rectilinear axis;

(j) an axial extension to the cross beam extending from one end thereof over said table;

(k) a tracing head for following said scale reproduction and sending signals to operate said drive means and said motor to drive the cutting head along the desired cutting path, said tracing head being mounted on the said extension so as to be movable along the axis of the beam;

(l) a first mechanical connection from one of said pulleys to said tracing head whereby, as said pulley rotates, the tracing head is moved along the axis of the beam a distance proportional to the distance moved by the cutting head along the beam; and (m) a second mechanical connection between the cross beam and the table effective to move the table along said parallel axis over a distance proportional to the distance moved by the beam along said rectilinear axis.

15. A profile cutting machine as claimed in claim 14, wherein the motor is adapted to drive itself along the cross beam and a second clamping means is provided whereby the motor may be clamped to the endless element thereby to drive the endless element around the pulleys.

16. A profile cutting machine as claimed in claim 15, wherein there is provided a rack extending along the cross beam and a pinion engaging said rack and mounted on a drive shaft from the motor.

17. A profile cutting machine as claimed in claim 14, wherein the tracing head is movable along the extension.

18. A profile cutting machine as claimed in claim 14, wherein the extension is movable with respect to the beam to effect movement of the tracing head along the axis of the beam.

19. A profile cutting machine as claimed in claim 14, wherein said first mechanical connection includes a pinion rotatable with the pulley and a rack connected to the tracing head and engaged by said pinion.

20. A profile cutting machine as claimed in claim 19, wherein the pitch circle diameter of said pinion is less than the effective diameter of the pulley.

21. A profile cutting machine as claimed in claim 14, wherein the said second mechanical connection comprises a rack secured to the table and a pinion engaging said rack and driven in response to movement of the cross beam along said rectilinear axis.

22. A profile cutting machine in claim 21, wherein said cross beam is mounted on wheels and wherein said second mechanical connection comprises a gear box having an output shaft which drives said pinion and an input shaft driven by one of said wheels.

23. A profile cutting machine as claimed in claim 22, wherein said second mechanical connection comprises a shaft driving said pinion, a second pinion mounted on said shaft, a second rack engaged by said second pinion and mounted on a fixed part of the machine and wherein the first drive means comprise a motor mounted on the cross beam said motor having an output shaft and on said output shaft a pinion engaging said second rack.

24. A profile cutting machine as claimed in claim 23, wherein the pitch circle of the first pinion engaging the rack on the table is less than the pitch circle diameter of the said second pinion engaging the second rack.

25. A profile cutting machine of the cross-carriage type comprising:

(a) a cross beam adapted to span the workpiece to be cut;

(b) drive means for driving the cross beam along a rectilinear axis transverse to the beam;

(c) a cutting head mounted on the beam and movable thereon along the axis of the beam;

(d) two pulleys spaced apart along the beam;

(e) a flexible substantially inextensible endless element passing around said pulleys;

(f) a motor adapted to drive itself along the cross beam;

(g) a first clamping means for clamping the endless element to the motor thereby to drive the endless element around the pulleys;

(h) a second clamping means for clamping the cutting head to the endless element so as to move along the beam thereby;

(i) a frame dependent from the cross beam;

(j) a table mounted in said frame for supporting a scale reproduction of the profile to be cut, said table being movable relative to the frame along an axis parallel to said rectilinear axis;

(k) an axial extension to the cross beam extending from one end thereof over said table;

(l) a tracing head for following said scale reproduction and sending signals to operate said drive means and said motor to drive the cutting head along the desired cutting path, said tracing head being mounted on the said extension so as to be axially movable along the extension;

(m) a first pinion rotatable with one of said pulleys;

(n) a first rack engaging said first pinion and attached to the tracing head whereby, as the pulley rotates, the tracing head is moved along said extension a distance proportional to the distance moved by the cutting head along the beam;

(o) a second rack secured to said table;

(p) a second pinion engaging said second rack and driven in response to movement of the cross beam, said second rack and pinion serving to move the table along said parallel axis a distance proportional to the distance moved by the cross beam along said rectilinear axis.

26. A profile cutting machine as claimed in claim 25, wherein there is provided a rack extending along the cross beam and a pinion engaging said rack and mounted on a drive shaft from the motor.

27. A profile cutting machine as claimed in claim 25, wherein the pitch diameter circle of said first pinion is less than the effective diameter of said pulley.

28. A profile cutting machine as claimed in claim 25, wherein there is provided a shaft driving said second pinion, a third pinion mounted on said shaft, a third rack mounted on a fixed part of the machine, and engaged by said third pinion, and wherein the said drive means comprises a motor mounted on the cross beam, said motor having an output shaft whereon is mounted a pinion engaging said third rack.

29. A profile cutting mahine as claimed in claim 28, wherein the pitch circle diameter of the second pinion is less than the pitch circle of the third pinion.

References Cited

UNITED STATES PATENTS

| | | | |
|---|---|---|---|
| 1,237,388 | 8/1917 | Robertson et al. | 33—23 |
| 2,494,663 | 1/1950 | Lobosco | 255—23 |
| 2,702,496 | 2/1955 | Davis et al. | 33—23 X |
| 3,037,760 | 6/1962 | Arnault | 266—23 |
| 3,063,698 | 11/1962 | Hancock | 266—23 |
| 3,110,278 | 11/1963 | Leader | 266—23 X |
| 3,172,938 | 3/1965 | Schwartz | 266—23 |

FOREIGN PATENTS

| | | |
|---|---|---|
| 704,639 | 3/1965 | Canada. |
| 677,477 | 11/1938 | Germany. |

J. SPENCER OVERHOLSER, *Primary Examiner.*

E. MAR, *Assistant Examiner.*